United States Patent [19]

Yang

[11] Patent Number: 4,810,137

[45] Date of Patent: Mar. 7, 1989

[54] DOUBLE-USE ELECTRICAL DRILL

[76] Inventor: Tai-Her Yang, 5-1 Taipin St., Si-Hu Town, Dzan-Hwa, Taiwan

[21] Appl. No.: 64,691

[22] Filed: Jun. 22, 1987

[51] Int. Cl.⁴ .............................................. B23B 45/14
[52] U.S. Cl. ..................... 408/100; 173/30; 408/111; 408/112; 408/136; 408/712
[58] Field of Search .................. 408/99, 100, 110–112, 408/136, 712, 241 R; 173/30; D8/67, 68, 70

[56] References Cited

U.S. PATENT DOCUMENTS

| | | | |
|---|---|---|---|
| 2,737,065 | 3/1956 | Piersall | 408/99 |
| 2,768,663 | 10/1956 | Jones | 408/112 |
| 2,888,965 | 6/1959 | Phillips | 408/110 X |
| 2,973,673 | 3/1961 | Grau | 408/99 |
| 3,827,822 | 8/1974 | Converse | 408/110 |
| 4,314,782 | 2/1982 | Beekenkamp | 408/110 X |

FOREIGN PATENT DOCUMENTS 3138516  8/1982  Fed. Rep. of Germany ... 408/241 R

Primary Examiner—Gil Weidenfeld
Assistant Examiner—Steven C. Bishop
Attorney, Agent, or Firm—Leonard Bloom

[57] ABSTRACT

A double-use electric drill including a frame and an electric hand drill that is secured thereto in either a first or a second orientation. In the first orientation, the frame is utilized as a hip or shoulder stock assembly when the drill is being used as a hand drill. In the second orientation, the frame is utilized as a drill press frame when the drill is being used as a drill press. The frame includes a column having a key portion formed thereon. The drill body includes a first keyway which receives the key portion of the column in the first orientation. The drill body further includes an opening including a second keyway. In the second orientation, the column is received in the opening with the key portion in the second keyway.

18 Claims, 3 Drawing Sheets

DOUBLE-USE ELECTRICAL DRILL

FIELD OF THE INVENTION

The present invention relates to portable electric drills and, in particular, to a portable electric drill and a holder therefor for positioning the drill in at least two different orientations for use, variously, as either a hand drill or a drill press.

BACKGROUND OF THE INVENTION

With the recent proliferation of do-it-yourself kits and items, the use of portable electric hand drills have become very popular. Such hand drills are readily adaptable for use in numerous, varied applications and in level, upward and downward directions. They permit many individuals to perform their own repair work in order to save money and to derive pleasure therefrom.

In order to enlarge its applications of usage, there have been several frames proposed for a portable electric hand drill which would permit the hand drill to be utilized in the same manner as a drill press. These proposed frames, of which I am aware, are as follows:

| U.S. Pat. No. | Inventor(s) | Year of Issue |
| --- | --- | --- |
| 2,768,663 | Jones | 1956 |
| 2,888,965 | Phillips | 1959 |
| 2,973,673 | Grau | 1961 |
| 4,314,782 | Beekenkamp | 1982. |

Unfortunately, when these frames are utilized, they do not permit the user or operator to utilize the drill as a hand drill.

U.S. Pat. No. 2,737,065 issued to Piersall discloses a frame which is adaptable for use as a drill press frame but which still permits the drill to be utilized as a hand tool. In this later instance, the frame provides a guide which aids the operator in drilling a straight even hole therewith. Unfortunately, like conventional hand drills, the frame disclosed by Piersall '065 is supported entirely by the hands of the user. Thus while aiding in the drilling of a straight hole (even at a skewed angle relative to the workpiece), use of the frame of Piersall '065 will still result in user fatigue which can result in skewered or otherwise noneven drilling.

In an effort to alleviate the problems associated with user fatigue resulting from the user supporting the drill and frame therefor entirely with the hands, West German Letters Pat. No. 31028888 to Wolf provides a shoulder stock assembly for a hand drill. While this assembly is useful for relieving user fatigue when the drill is utilized as a hand drill, it is not usable when it is desired to utilize the drill as a drill press.

Thus, it can be seen that there remains a need for a frame and a portable electric hand drill which is mountable thereto in a first orientation, wherein the frame is utilized as a shoulder or hip stock when the drill is used as a hand drill, and in a second orientation, wherein the frame is utilized as a drill press frame when the drill is used as a drill press.

SUMMARY OF THE INVENTION

Accordingly, it is a primary object of the present invention to provide a double-use electric drill having a frame and an electric hand drill that is selectively mountable thereto in either a first orientation, wherein the frame is utilized as a shoulder or hip stock when the drill is used as a hand drill or in a second orientation, wherein the frame is utilized as a drill press frame when the drill is used as a drill press mounted on a bench or table.

It is another object of the present invention to provide such a double-use electric drill which substantially relieves the user fatigue that results from the user supporting the drill with their hands.

It is still another object of the present invention to provide a portable hand drill which, whether used as a hand drill or a drill press is keyed to a frame, so that good longitudinal sliding movement of the drill thereon without substantial lateral movement thereof is provided.

In accordance with the teachings of the present invention, there is disclosed a double-use electric drill including an electric hand drill and a frame on which the hand drill is mounted. The drill includes a body portion having a first keyway formed therein. At least one handle is formed thereon. The handle has an opening formed therethrough. A portion of the opening includes a second keyway formed in the handle. The second keyway is substantially identical to the first keyway. The second keyway is positioned substantially inverted relative to the first keyway. A frame, including a substantially longitudinally projecting column having a one end is provided. This frame further includes a support which is positioned at one end of the column. The column has a key portion formed thereon. This key portion is selectively slidably received for longitudinal sliding movement in either the first keyway or the second keyway. The key portion of the column is selectively, slidably received in the first keyway for longitudinal sliding movement therein. In this manner, the column is keyed in the first keyway assuring longitudinal sliding movement of the drill without substantial lateral movement. The column further has a cross-section sized for being selectively, slidably received in the opening formed in the handle with the key portion of the column being slidably received in the second keyway for longitudinal sliding movement therein. In this manner, the column is keyed in the second keyway and the opening of the handle assuring longitudinal sliding movement of the drill without substantial lateral movement. For use as a power hand tool, the drill is selectively mountable on the frame being keyed to the first keyway in a first orientation. In this manner, the support may be supported on a shoulder or hip of a user with the frame usable as a shoulder or hip stock for slidably moving the drill in the second direction away from the support and towards a workpiece. For use as a drill press, the drill is selectively mountable on the frame being received and keyed in both the opening and the second keyway in a second orientation, such that the support may support the workpiece with the frame usable as a drill press frame for slidably moving the drill in the first direction towards the support and the workpiece.

Preferably, the body portion of the drill has a pair of handles formed thereon. Each of the handles has a respective opening, including a respective second keyway, formed therein. Each of said openings and second keyways are substantially aligned with one another, such that additional stability is provided when the drill is selectively mounted on the frame being keyed in the respective second keyway and opening of each handle.

It is further preferred to include means for selectively sliding and securing the drill along the column of the frame. This means includes a slide ring that is annularly received about and carried by the column for longitudinal sliding movement thereon in the first and second opposite directions. A set screw is carried by the slide ring for movement between a disengaged position, wherein the set screw is spaced from the column permitting the ring to freely slide thereon in the first and second opposite directions, and an engaged position, wherein the set screw contacts the column securing the ring in place thereon. Finally, a support strut is provided. This strut has a first end and a second opposite end. The first end of the strut is carried by the slide ring for movement therewith in the first and second directions. The second end of the strut is integral with the drill, such that the slide ring and the drill slide concomitantly with one another. If desired the drill further includes a resilient biasing means for constantly resiliently and selectively urging the slide ring away from either the support of the frame or the drill. Preferably, the resilient biasing means is comprised of a coil spring having a one end that is integral with the slide ring and a second end that is remote therefrom. The coil spring is annularly positioned about the column. In this fashion, when the second end is selectively positioned contacting the support, the slide ring is urged away therefrom, and when the second end is selectively positioned contacting the drill, the slide ring is urged away therefrom.

These and other objects of the present invention will become apparent from a reading of the following specification, taken in conjunction with the enclosed drawings.

BRIEF DESCRIPTION OF THE DRAWINGS

FIG. 1-1 is a side view of the double-use electric drill of the present invention showing the positioning of the drill in its second orientation relative to the frame, wherein the frame is utilized as a drill press frame when the drill is used as a drill press.

FIG. 1-2 is a front view of the double-use electric drill of FIG. 1-1.

FIG. 1-3 is a top view of the double-use electric drill of FIG. 1-1.

FIG. 1-4 is a perspective view of the double-use electric drill of FIG. 1.

FIG. 1-5 is a perspective view of the double-use electric drill of FIG. 1-1.

BRIEF DESCRIPTION OF PREFERRED EMBODIMENTS

Figure 1:
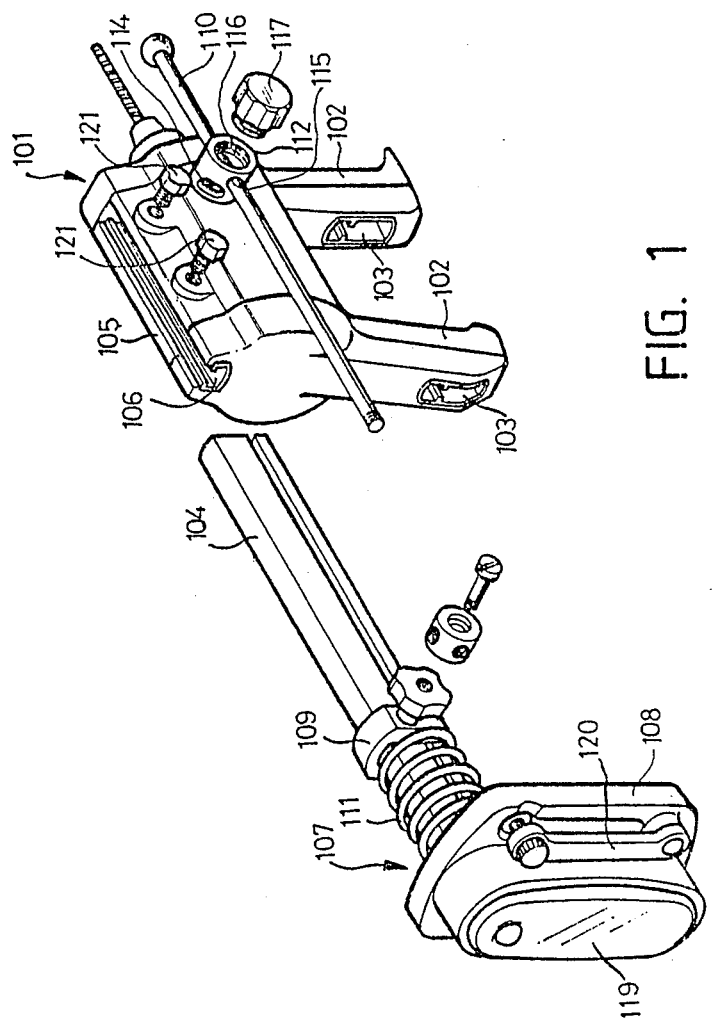
FIG. 1 is a perspective view of the double-use electric drill of the present invention, partially exploded for the sake of clarity, showing the positioning of the drill in its first orientation relative to the frame, wherein the frame is utilized as a shoulder or hip stock when the drill is used as a power hand drill.
Figure 1:
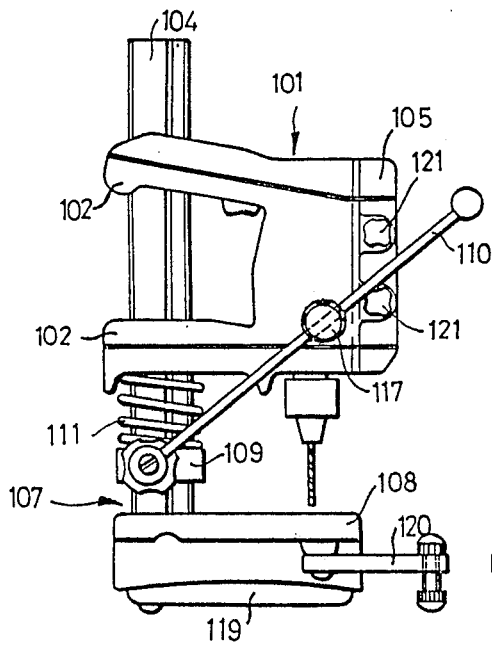
Figures 1, 2:
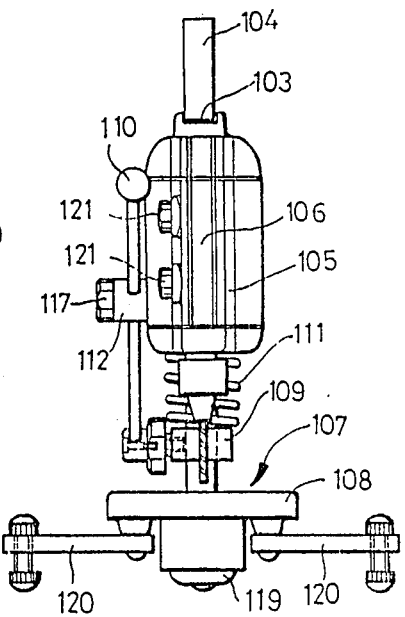
Figures 1, 2, 3:
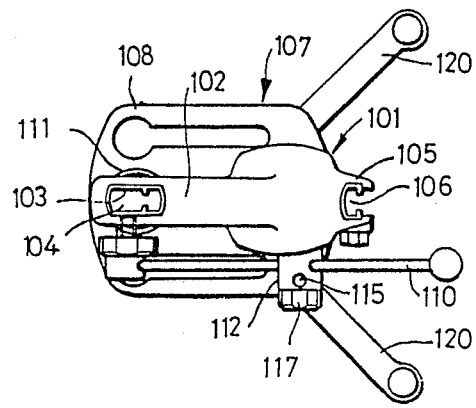
Figures 1, 2, 3, 4:
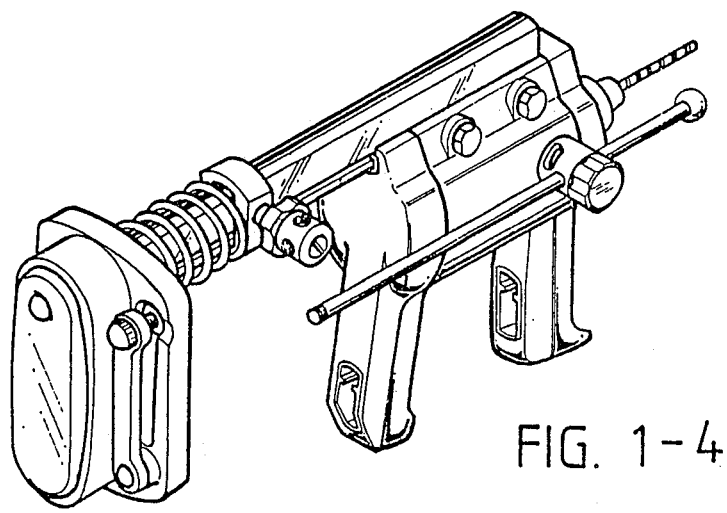
Figures 1, 2, 3, 4, 5:
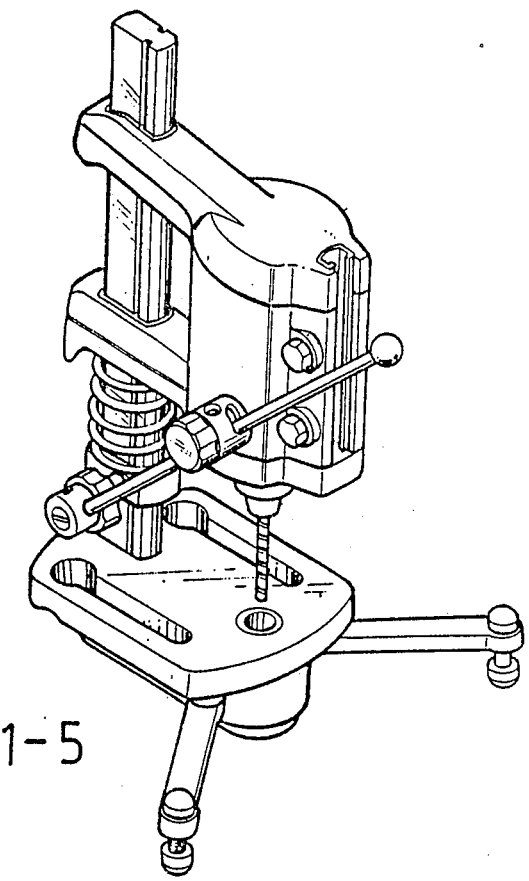

Referring now to the drawings, the double-use electric drill includes a frame 107 and a portable electric hand drill 101 which is mountable thereto in two different orientations. In a first orientation, the frame 107 is usable as a shoulder or hip stock assembly for supporting the drill 101 when it is being used as a hand drill. This helps to alleviate the fatigue which can result when the user (operator) is performing drilling operations over a long period of time, particularly when drilling on a horizontal or upward level (FIGS. 1 and 1-4). In a second orientation, the frame 107 is usable as a drill frame which supports the drill 101 when it is being used as a drill press (FIGS. 1-1, 1-2, 1-3 and 1-5).

The portable electric drill of the present invention includes a main body or casing. Housed in the main body is a conventional driving motor and the necessary electrical elements, such as a switch, for providing output for driving and rotating the drill portion when performing work on a workpiece. The drill components are of the conventional variety capable of performing drilling, grinding, planing and jigboring operations, to name but a few.

The body portion of the drill 101 has a first keyway 106 formed therein. As illustrated, this first keyway 106 is, preferably a blind ended keyway 106. It is preferred that this first keyway 106 be formed on the uppermost portion (or the top) 105 of the body portion of the drill 101.

A pair of tightening (set) screws 121 are provided disposed in the top 105 for adjusting the width of the first keyway 106 as desired. The tightening of these tightening screws 121 will adjust the keyway 106 to the width of the column 104, to improve the interfit therebetween when the column 104 is received in the keyway 106, as shall be discussed below.

The drill 101 includes at least one and, preferably, a pair of handles 102. When used apart from the frame 107, each of the handles 102 may be gripped by the user. Each of the handles 102 has an opening 103 formed therethrough. A portion of each opening 103 includes a second keyway that is formed in the respective handle 102. Preferably, this second keyway is formed in the uppermost portion (the top) of the openings 103. It is further preferred that each of said openings 103 and second keyways be substantially aligned with one another.

This second keyway is, preferably, open ended. Otherwise, it is preferred that the second keyway be substantially identical in shape and size to the first keyway 106. It is also preferred that this second keyway be positioned opposite to, or inverted relative to the first keyway 106.

The frame 107 includes a substantially longitudinally projecting column 104. This column 104 has a one end and a second end that is remote from the one end. The frame also has a platform (support) 108 positioned at and integral with the one end of the column 104. Overall, as seen from the side, this frame 107 and support 108 have an "L-shaped" appearance.

The column 104 has a key portion formed thereon. This key portion is sized and shaped for being selectively slidably received in either the first keyway 106 or the second (opposite) keyway. It is noted that the column 104 itself has a cross-section that is sized for being selectably slidably received in the opening 103 of each of the handles 102 with the key portion in the second keyway. This keying arrangement assures the longitudinal sliding movement of the drill 101 along the column 104 without substantial lateral movement of the drill 101. When two handles 102 are provided, additional stability is provided.

The double-use drill 101 further includes a means for selectively sliding and securing the drill 101 along the column 104 of the frame 107. This means includes a slide ring (union ring) 109 that is annularly received about and carried by the column 104 for longitudinal sliding movement thereon in the first and second opposite directions.

The slide ring 109 carries a set screw for movement between an engaged position and a disengaged position. In the engaged position, the set screw contacts the column 104 securing the ring 109 in place thereon. In the disengaged position, the set screw is spaced from the column 104 permitting the ring 109 to freely slide thereon in the first and second opposite directions.

A support strut 110 having a first end and a second opposite end is also provided for joining the drill 101 to the slide ring 109. The first end of the strut is carried by the slide ring 109 for movement therewith in the first and second directions. Preferably, this first end is threadably engaged in a strut lug which, in turn is carried on the set screw and the slide ring 109. The second end of the strut 110 is integral with the drill. In this fashion, the strut 110 is moved in response to movement of the slide ring 109 in the first and second directions.

Preferably, the second end of the strut 110 is made integral with the main body by use of a support lug (transverse handle) 112 which is carried on a side of the main body of the drill 101. Support lug 112 has a first pair of aligned punched holes 114 and a second pair of aligned punched holes 115, formed therein. These pairs of aligned punched holes 114 and 115 receive the strut 110 therethrough. The strut is received through holes 114 when the drill 101 is used in its second orientation as a drill press and through holes 115 when the drill 101 is used in its first orientation as a hand drill. Preferably the holes 114 and 115 are slightly larger than the cross-section of the strut 110, so that some play is provided therebetween.

A set screw 117 is axially threaded into a threaded aperture formed in the lug 112 until the set screw 117 contacts the strut 110, clamping the strut 110 in position between the screw 117 and the edge of one of the pairs of holes 114 or 115. This integrally joins the second end of the strut 110 with the drill 101, so that they slide concomitantly with one another.

When the drill 101 is used as a hand drill, the support strut 110 is properly adjusted and fixed by the set screw 117 in the holes 115 to serve the function of limiting the movement of the drill 101 for restriction of the depth of the hole being drilled (see FIGS. 1 and 1-4). When the drill 101 is used as a drill press, the support strut 110 is properly adjusted and fixed by set screw 117 in the holes 114 to serve the function of limiting the movement of the drill 101 for restriction of the depth of the hole being drilled (see FIGS. 1-1, 1-2, 1-3 and 1-5).

A resilient biasing means constantly, resiliently and selectively urges the slide ring 109 away from either the support 108 of the frame 107 or the drill 101. This means is a coil spring 111 that has a one end that is integral with the slide ring 109 and a second end that is remote therefrom. The coil spring 111 is annularly, slidably positioned about the column 104. In this fashion, when the drill 101 is mounted to the frame 107 in the first orientation for use as a hand drill, the second end of the coil spring 111 is selectively positioned contacting the support 108, constantly urging the slide ring 109 away therefrom (see FIGS. 1-1, 1-2, 1-3 and 1-5).

Finally, the support 108 has a pair of retractable legs 120 that are carried thereby. Each of the legs has a respective first end and a second, opposite end. The first end of each respective leg 120 is pivotably secured to the support 108 at a respective pivot point for pivotal movement thereabout. Secured thusly, the legs 120 pivot between an extended position, wherein the legs 120 extend outwardly from the support 108 for providing additional stability when the drill is in its second orientation for use as a drill press (FIGS. 1-1, 1-2, 1-3 and 1-5), and a retracted position, wherein the legs 120 are nested in the support 108. This permits the support 108 to be utilized as a shoulder or hip support stock assembly when the drill is in its first orientation, for use as a hand drill (FIGS. 1 and 1-1).

In order to consider the comfortableness of the operator's hip or shoulder, when the drill 101 is supported thereon during use thereof as a hand drill, the support 108 is provided with a cushion (spring mattress) 119 on the bottom of the support 108. This cushion 119 also enhances the stability of the drill when utilized as a hand drill.

Having thus described the structure of the double-use drill, its use is now described.

With particular reference now to FIGS. 1 and 1-1, to use the drill as a hand drill, the drill 101 is mounted to the frame 107 in the first orientation. In the first orientation, the slide ring 109 and the coil spring 111 is disposed on the column 104, so that the second end of the coil spring 111 contacts the support 108, for constantly resiliently urging the slide ring 109 away from the support 108. The key portion of the column is slidably received in the first keyway, so that the tool of the drill 101 is oriented away from the support 108. The first end of the second strut is secured to the set screw of the slide ring 109 and the second end received through holes 115 formed in lug 112. Screw 117 is then threadably engaged in aperture 116, securing the strut to the lug 112 and consequently the drill 101.

The slide ring 109 and the drill 101 are then concomitantly longitudinally slid along the column 104 via strut 120 to a desired position on the column 104. The set screw is then moved into its engaged position, securing the slide 109 in place. If desired, the set screw may be left in its disengaged position, permitting the free movement of the slide ring 109 thereon.

With particular reference now to FIGS. 1-1, 1-2, 1-3 and 105, to use the drill as a drill press, the drill 101 is mounted to the frame 107 in the second orientation. In the second orientation, the legs 120 are placed in their extended position. The slide ring 109 and the coil spring 111 is disposed on the column 104, so that the second end of the coil spring 111 contacts the one handle 102 of the drill 101, for constantly, resiliently urging the slide ring 109 away from the support 108. The key portion of the column 104 is slidably received in each of the second keyways while the column itself is slidably received in each of the openings 103, so that the tool of the drill 101 is oriented towards the support 108. The first end of the second strut is secured to the set screw of the slide ring 109 and the second end received through holes 114 formed in the lug 112. Screw 117 is then threadably engaged in aperture 116, securing the strut 120 to the lug 112 and consequently the drill 101.

The slide ring 109 and the drill 101 are concomitantly longitudinally slid along the column 104 via strut 120 to a desired position on the column 204. The set screw is then moved into its engaged position, securing the slide ring 109 in place.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A double-use electric drill, comprised of:

an electric hand drill including a body portion having a first and a second opposite keyways formed therein, said second keyway being substantially identical to the first keyway, said second keyway positioned substantially inverted relative to the first keyway;

a frame including a substantially longitudinally projecting column having a one end, said frame further including a support positioned to the one end of the column;

the column having a key portion formed thereon, said key portion being selectively slidably received for longitudinal sliding movement in either the first keyway or the second opposite keyway;

whereby for use as a power hand tool, the drill is selectively mountable on the frame being keyed to the first keyway in a first orientation, such that the support may be supported on a shoulder or hip of a user with the frame usable as a shoulder or hip stock for slidably moving the drill in the second direction away from the support and towards a workpiece; and further whereby for use as a drill press, the drill is selectively mountable on the frame being keyed to the second keyway in a second orientation, such that the support may support the workpiece with the frame usable as a drill press frame for slidably moving the drill in the first direction towards the support and the workpiece.

2. A double-use electric drill, comprised of:

an electric hand drill including a body portion having a first keyway formed therein and further having at least one handle formed thereon, said handle having an opening formed therethrough, a portion of said opening including a second keyway formed in the handle, said second keyway being substantially identical to the first keyway;

a frame including a substantially longitudinally projecting column having a one end, said frame further including a support positioned at one end of the column;

the column having a key portion formed thereon, said key portion being selectively slidably received for longitudinal sliding movement in either the first keyway or the second keyway;

the key portion of the column being selectively, slidably received in the first keyway for longitudinal sliding movement therein, such that the column is keyed in the first keyway assuring longitudinal sliding movement of the drill without subtantial lateral movement;

the column further having a cross-section sized for being selectively, slidably received in the opening formed in the handle with the key portion of the column being slidably received in the second keyway for longitudinal sliding movement therein, such that the column is keyed in the second keyway and the opening of the handle assuring longitudinal sliding movement of the drill without substantial lateral movement;

whereby for use as a power hand tool, the drill is selectively mountable on the frame being keyed to the first keyway in a first orientation, such that the support may be supported on a shoulder or hip of a user with the frame usable as a shoulder or hip stock for slidably moving the drill in the second direction away from the support and towards a workpiece; and further whereby for use as a drill press, the drill is selectively mountable on the frame being received and keyed in both the opening and the second keyway in a second orientation, such that the support may support the workpiece with the frame usable as a drill press frame for slidably moving the drill in the first direction towards the support and the workpiece.

3. A double-use electric drill, comprised of:

an electric hand drill including a body portion having a first keyway formed therein and further having at least one handle formed thereon, said handle having an opening formed therethrough, a portion of said opening including a second keyway formed in the handle, said second keyway being substantially identical to the first keyway, said second keyway positioned substantially inverted relative to the first keyway;

a frame including a substantially longitudinally projecting column having a one end, said frame further including a support positioned at one end of the column;

the column having a key portion formed thereon, said key portion being selectively slidably received for longitudinal sliding movement in either the first keyway or the second keyway;

the key portion of the column being selectively, slidably received in the first keyway for longitudinal sliding movement therein, such that the column is keyed in the first keyway assuring longitudinal sliding movement of the drill without substantial lateral movement;

the column further having a cross-section sized for being selectively, slidably received in the opening formed in the handle with the key portion of the column being slidably received in the second keyway for longitudinal sliding movement therein, such that the column is keyed in the second keyway and the opening of the handle assuring longitudinal sliding movement of the drill without substantial lateral movement;

whereby for use as a power hand tool, the drill is selectively mountable on the frame being keyed to the first keyway in a first orientation, such that the support may be supported on a shoulder or hip of a user with the frame usable as a shoulder or hip stock for slidably moving the drill in the second direction away from the support and towards a workpiece; and further whereby for use as a drill press, the drill is selectively mountable on the frame being received and keyed in both the opening and the second keyway in a second orientation, such that the support may support the workpiece with the frame usable as a drill press frame for slidably moving the drill in the first direction towards the support and the workpiece.

4. The double-use electric drill of claim 3, wherein the body portion of the drill has a pair of handles formed thereon, each of said handles having a respective opening including a respective second keyway formed therein, and further wherein each of said openings and second keyways are substantially aligned with one another, such that additional stability is provided when the drill is selectively mounted on the frame being keyed in the respective second keyway and opening of each handle.

5. The double-use electric drill of claim 3, further comprised of a means for selectively sliding and securing the drill along the column of the frame, said means including:
   a slide ring annularly received about and carried by the column for longitudinal sliding movement thereon in the first and second opposite directions;
   a set screw carried by the slide ring for movement between a disengaged position, wherein the set screw is spaced from the column permitting the ring to freely slide thereon in the first and second opposite directions and an engaged position, wherein the set screw contacts the column securing the ring in place thereon; and
   a support strut having a first end and a second opposite end, the first end of the strut also being carried by the slide ring for movement therewith in the first and second directions, the second end of the strut being integral with the drill, such that the slide ring and the drill slide concomitantly with one another.

6. The double-use electric drill of claim 5, further including a resilient biasing means for constantly resiliently and selectively urging the slide ring away from either the support of the frame or the drill.

7. The double-use electric drill of claim 6, wherein the resilient biasing means is comprised of a coil spring having a one end integral with the slide ring and further having a second end remote therefrom, said coil spring being annularly positioned about the column, such that when the second end is selectively positioned contacting the support, the slide ring is urged away therefrom, and further such that when the second end is selectively positioned contacting the drill, the slide ring is urged away therefrom.

8. The double-use electric drill of claim 3, wherein the support further includes a pair of retractable legs carried by the support for movement between an extended position, wherein the legs extend outwardly from the support for providing additional stability when the drill is in its second orientation for use as a drill press, and further between a retracted position, wherein the legs are nested in the support for permitting the support to be utilized as a shoulder or hip support when the drill is in its first orientation for use as a hand drill.

9. The double-use electric drill of claim 8, wherein each of the retractable legs has a respective first end and a respective second opposite end, the first end of each respective leg being pivotably secured to the support at a respective pivot point for pivotal movement thereabout between the extended and retracted positions.

10. A double-use electric drill, comprised of:
   an electric hand drill including a body portion having a first keyway formed therein and further having at least one handle formed thereon, said handle having an opening formed therethrough, a portion of said opening including a second keyway formed in the handle, said second keyway being substantially identical to the first keyway, said second keyway positioned substantially inverted relative to the first keyway;
   a frame including a substantially longitudinally projecting column having a one end, said frame further including a support positioned at one end of the column;
   the column having a key portion formed thereon, said key portion being selectively slidably received for longitudinal sliding movement in either the first keyway or the second keyway;
   the key portion of the column being selectively, slidably received in the first keyway for longitudinal sliding movement therein, such that the column is keyed in the first keyway assuring longitudinal sliding movement of the drill without substantial lateral movement;
   the column further having a cross-section sized for being selectively, slidably received in the opening formed in the handle with the key portion of the column being slidably received in the second keyway for longitudinal sliding movement therein, such that the column is keyed in the second keyway and the opening of the handle assuring longitudinal sliding movement of the drill without substantial lateral movement;
   whereby for use as a power hand tool, the drill is selectively mountable on the frame being keyed to the first keyway in a first orientation, such that the support may be supported on a shoulder or hip of a user with the frame usable as a shoulder or hip stock for slidably moving the drill in the second direction away from the support and towards a workpiece;
   further whereby for use as a drill press, the drill is selectively mountable on the frame being received and keyed in both the opening and the second keyway in a second orientation, such that the support may support the workpiece with the frame usable as a drill press frame for slidably moving the drill in the first direction towards the support and the workpiece; and
   wherein the body portion of the drill has a pair of handles formed thereon, each of said handles having a respective opening including a respective second keyway formed therein, and further wherein each of said openings and second keyways are substantially aligned with one another, such that additional stability is provided when the drill is selectively mounted on the frame being keyed in the respective second keyway and opening of each handle.

11. The double-use electric drill of claim 10, further comprised of a means for selectively sliding and securing the drill along the column of the frame, said means including:
   a slide ring annularly received about and carried by the column for longitudinal sliding movement thereon in the first and second opposite directions;
   a set screw carried by the slide ring for movement between a disengaged position, wherein the set screw is spaced from the column permitting the ring to freely slide thereon in the first and second opposite directions and an engaged position, wherein the set screw contacts the column securing the ring in place thereon; and
   a support strut having a first end and a second opposite end, the first end of the strut also being carried by the slide ring for movement therewith in the first and second directions, the second end of the strut being integral with the drill, such that the slide ring and the drill slide concomitantly with one another.

12. The double-use electric drill of claim 11, further including a resilient biasing means for constantly resiliently and selectively urging the slide ring away from either the support of the frame or the drill.

13. The double-use electric drill of claim 12, wherein the resilient biasing means is comprised of a coil spring having a one end integral with the slide ring and further having a second end remote therefrom, said coil spring being annularly positioned about the column, such that when the second end is selectively positioned contacting the support, the slide ring is urged away therefrom, and further such that when the second end is selectively positioned contacting the drill, the slide ring is urged away therefrom.

14. The double-use electric drill of claim 10, wherein the support further includes a pair of retractable legs carried by the support for movement between an extended position, wherein the legs extend outwardly from the support for providing additional stability when the drill is in its second orientation for use as a drill press, and further between a retracted position, wherein the legs are nested in the support for permitting the support to be utilized as a shoulder or hip support when the drill is in its first orientation for use as a hand drill.

15. The double-use electric drill of claim 14, wherein each of the retractable legs has a respective first end and a respective second opposite end, the first end of each respective leg being pivotably secured to the support at a respective pivot point for pivotal movement thereabout between the extended and retracted positions.

16. In a dual-mode power tool adapted to be used in either a portable mode or else in a fixed mode, the latter in cooperation with a bench, comprising, in combination, a tool housing having a pair of spaced-apart depending housing portions, at least one of which may be gripped as a handle, thereby facilitating use of the power tool in its portable mode, each of the housing portions having a keyway formed therein, the keyways being substantially aligned with each other, and a stand adapted to be supported on the bench, the stand including a column having a key complementary to the aligned keyways in the housing portions, such that the housing portions may be slidably received on the column for limited vertical movement of the tool housing on the stand, thereby facilitating use of the power tool in its fixed mode.

17. The combination of claim 16, wherein the power tool comprises a portable electric drill, and wherein the stand comprises a drill press stand.

18. The combination of claim 16, wherein the tool housing has a top portion provided with a longitudinal keyway formed therein substantially oppositely of the depending housing portions, such that the column on the stand may be slidably received within the longitudinal keyway on the tool housing and keyed thereto, means for releasably clamping the tool housing on the column in a desired selected position, and the column having a rearward end portion provided with a cushioned support, such that the cushioned support may rest against the shoulder or hip of the operator for more comfortable use of the power tool in its portable mode, especially for extended periods of use thereof.

* * * * *